United States Patent
Choi et al.

(10) Patent No.: US 12,334,831 B2
(45) Date of Patent: Jun. 17, 2025

(54) UNITARY CHARGING DEVICE FOR LOW AND HIGH VOLTAGES

(71) Applicant: FOUNDATION FOR RESEARCH AND BUSINESS, SEOUL NATIONAL UNIVERSITY OF SCIENCE AND TECHNOLOGY, Seoul (KR)

(72) Inventors: Sewan Choi, Seoul (KR); Gi Bum Yu, Seoul (KR)

(73) Assignee: Foundation for Research and Business, Seoul National University of Sicene and Technology, Seoul (KR)

( * ) Notice: Subject to any disclaimer, the term of this patent is extended or adjusted under 35 U.S.C. 154(b) by 148 days.

(21) Appl. No.: 18/007,741

(22) PCT Filed: Feb. 2, 2021

(86) PCT No.: PCT/KR2021/001383
§ 371 (c)(1),
(2) Date: Dec. 2, 2022

(87) PCT Pub. No.: WO2021/251583
PCT Pub. Date: Dec. 16, 2021

(65) Prior Publication Data
US 2023/0246555 A1    Aug. 3, 2023

(30) Foreign Application Priority Data
Jun. 8, 2020    (KR) .......................... 10-2020-0069089

(51) Int. Cl.
*H02M 3/335*    (2006.01)
*H02J 7/00*    (2006.01)
(Continued)

(52) U.S. Cl.
CPC ....... *H02M 3/33573* (2021.05); *H02J 7/0013* (2013.01); *H02J 7/02* (2013.01);
(Continued)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 10,079,541 B1 *   9/2018   Taban ............... H02M 3/33546
10,333,398 B2     6/2019   Takahashi et al.
(Continued)

FOREIGN PATENT DOCUMENTS

JP    2017-221103 A    12/2017
JP    6364553 B2    7/2018
(Continued)

OTHER PUBLICATIONS

Gibum Yu et al., "OBC-LDC Integrated Charger with Entire ZVS Range using Common Leg", Power Electronics Conference Proceedings, pp. 94-96, Aug. 18-20, 2020.

*Primary Examiner* — Sean Kayes
*Assistant Examiner* — Nusrat Quddus
(74) *Attorney, Agent, or Firm* — You & IP, LLC

(57) ABSTRACT

Disclosed is a unitary charging device for low and high voltages. According to a specific embodiment, one leg of a switching element of an insulated DC-DC converter, the secondary side of a high voltage transformer, and the primary side of a low voltage transformer are shared, and thus the number of switching elements of the charging device and gate drivers for operating the multiple switching elements can be reduced, reliability is improved, and the performance of the unitary charging device can improve even when the number of switching elements is reduced. Due to the shared
(Continued)

use of an EMI filter and an input capacitor of a high voltage battery, not only can the price and volume of the charging device be decreased, but conduction loss and switching loss can also be reduced to increase efficiency.

16 Claims, 13 Drawing Sheets

(51) Int. Cl.
  *H02J 7/02* (2016.01)
  *H02M 1/08* (2006.01)
  *H02M 3/00* (2006.01)
(52) U.S. Cl.
  CPC ............... *H02M 1/08* (2013.01); *H02M 3/01* (2021.05); *H02J 2207/20* (2020.01)
(58) Field of Classification Search
  CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; G05F 1/30; G05F 1/33; G05F 1/32; G05F 1/34; G05F 1/38; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/12; H02M 3/3155; H02M 7/1557; H02M 7/1626; H02M 1/4208; H02M 7/219; H02M 7/151; H02M 1/4233; H02M 5/4585; H02M 7/1552; H02M 7/1623; H02M 1/4225; H02M 3/073; H02M 3/137; H02M 7/00; H02M 7/064; H05B 39/048; B23K 11/24; H04B 2215/069; Y02B 70/1491; H02J 3/46; H02J 3/38; H02J 7/12

See application file for complete search history.

(56) References Cited

U.S. PATENT DOCUMENTS

| | | | |
|---|---|---|---|
| 11,021,069 B1* | 6/2021 | Elshaer | B60L 50/60 |
| 2007/0195557 A1* | 8/2007 | Su | H02M 3/285 |
| | | | 363/17 |
| 2012/0068663 A1 | 3/2012 | Tanikawa et al. | |
| 2014/0225439 A1* | 8/2014 | Mao | H02J 50/12 |
| | | | 307/31 |
| 2015/0180350 A1* | 6/2015 | Huang | H02M 3/33584 |
| | | | 307/66 |
| 2016/0016479 A1* | 1/2016 | Khaligh | H02M 1/4258 |
| | | | 336/170 |
| 2017/0353111 A1 | 12/2017 | Elasser et al. | |
| 2018/0222333 A1 | 8/2018 | Khaligh et al. | |
| 2018/0229622 A1 | 8/2018 | Matsumoto | |
| 2018/0241306 A1* | 8/2018 | Takahashi | H02M 3/3376 |
| 2019/0348833 A1* | 11/2019 | Sun | H02M 7/219 |
| 2021/0155100 A1* | 5/2021 | Khaligh | B60L 55/00 |
| 2022/0103083 A1* | 3/2022 | Zhou | H02M 1/348 |

FOREIGN PATENT DOCUMENTS

| | | |
|---|---|---|
| KR | 10-2012-0031131 A | 3/2012 |
| KR | 10-2016-0038348 A | 4/2016 |
| KR | 10-2016-0134277 A | 11/2016 |
| KR | 10-2018-0027634 A | 3/2018 |

* cited by examiner

UNITARY CHARGING DEVICE FOR LOW AND HIGH VOLTAGES

TECHNICAL FIELD

The present disclosure relates to a unitary charging device for low and high voltages. More particularly, the present disclosure relates to a technology that may charge a high voltage battery with a DC link voltage with respect to AC power provided from the outside by using one module and then charge a low voltage battery with a charged voltage of a charged high voltage battery.

BACKGROUND ART

Recently, as electric vehicles have become popularized, high output, high efficiency, and high power density of electric vehicle chargers are attracting attention. Battery capacity is increasing due to a decrease in the price and an increase in the energy density of a battery for an electric vehicle. For example, in the case of the Nissan Leaf, the battery capacity increased fivefold in five years from 24 kWh in 2013 to 110 kWh in 2018.

Accordingly, the capacity of a high voltage charger for the electric vehicle was initially used at 3.3 kW, which is Level 1, and is mainly used nowadays at single-phase 6.6 kW and 3-phase 11 kW, which are Level 2. On the other hand, the capacity is expected to increase and be used at no less than 22 kW in the future. In addition, low voltage battery chargers are mainly used with 1.8 kW and 3 kW currently but are expected to increase to 5 kW with the development of autonomous driving technology in the future. As the capacity of the electric vehicle battery charger increases, the price and volume of the entire system increase, whereby the fuel efficiency of the electric vehicle is lowered and a large volume is occupied inside the electric vehicle. Accordingly, as the power of the on-board charger for the electric vehicle continues to increase, a compact, lightweight, and efficient on-board charger is required.

In order to reduce the volume and weight of the charger, a high voltage battery and a low voltage battery of the electric vehicle are not separately installed, but the housing is developed by being integrated. However, this does not reduce elements in an overall circuit, but simply uses a case and a cooler in common, so it does not significantly reduce the overall system volume. Accordingly, there have been many studies to integrate a high voltage battery charger and a low voltage battery charger into a circuit However, most of integrated battery charging circuits for low and high voltages have a structure that integrates a transformer to reduce the volume, so an entire system may have the reduced volume and price but lowered performance, reliability and efficiency, making it difficult to mass-produce most of the circuits.

In addition, since the transformer is provided as one unit, the size of the transformer increases, thereby not only increasing the size of the overall system but also reducing the reliability and ease of industrial application of the system.

DISCLOSURE

Technical Problem

Accordingly, the present disclosure has been made keeping in mind the above problems occurring in the related art and is intended to provide a unitary charging device for low and high voltages. Here, as one leg of a switching element of an isolated DC-DC converter is shared with a secondary side of a high voltage transformer and a primary side of a low voltage transformer, the unitary charging device may reduce the number of switching elements of a charging device and reduce gate drivers for operating the multiple switching elements, improve reliability thereof, and, although the number of switching elements is reduced, increase the performance of the unitary charging device.

In addition, the present disclosure is intended to provide a unitary charging device for low and high voltages that may not only reduce the price and volume of the charging device but also increase efficiency by reducing the conduction loss and switching loss, due to the shared use of an EMI filter and an input capacitor of a high voltage battery.

The objective of the present disclosure is not limited to the objective mentioned above, and other objectives and advantages of the present disclosure not mentioned may be understood by the following description, and will be more clearly understood by the examples of the present disclosure. Furthermore, it will be readily noticed that the objectives and advantages of the present disclosure may be realized by the means and combinations thereof indicated in the appended claims.

Technical Solution

In order to accomplish the above objectives, there may be provided a unitary charging device for low and high voltages according to an embodiment, the device including: a DC link configured to link DC power converted with respect to AC power externally supplied to output a DC link voltage; a resonance converter configured to allow the DC link voltage connected to an output end of the DC link to be resonated and to transfer an output signal of a resonance frequency; a high voltage transformer connected to an output end of the resonance converter and configured to step up the output signal of the resonance converter based on a turns ratio; and a DC-DC converter connected to a secondary side of the high voltage transformer and configured to convert an output signal of the high voltage transformer into a DC voltage and then link the DC voltage to a high voltage battery to charge the high voltage battery, thereby allowing a high voltage battery to be charged with a linked DC voltage, and further including: a low voltage transformer connected to an opposite end of the DC-DC converter and configured to perform a phase shift of the DC voltage of the DC-DC converter and perform a step-down of the DC voltage based on a turns ratio, thereby outputting a DC voltage; and a filter configured to perform filtering for an output signal of the low voltage transformer.

The resonance converter may include:
a switching part including a first switching element to a fourth switching element of a full bridge configured to perform a switching operation complementary to each other based on a gate signal externally supplied, thereby allowing the DC link voltage to be passed therethrough; and an LLC resonance part including: a first inductor and a first capacitor each having one end respectively connected in series between each of elements corresponding thereto of the first switching element to the fourth switching element; and a second inductor having one end and an opposite end respectively connected between a point between an opposite end of the first inductor and one end of a primary side of the high voltage transformer and between a point between an opposite end of the first capacitor and an opposite end of the primary side of the high voltage transformer, thereby making an LLC resonance be generated for DC link voltages that have passed through the switching part and transferring a resonated DC link voltage to the high voltage transformer.

The resonance converter may include:
first and second capacitors for distribution configured to distribute the DC link voltage and transfer distributed DC link voltages to opposite ends of a primary side of the high voltage transformer, respectively; and
switching part including a first switching element and a second switching element of a half-bridge, thereby outputting a series link voltage, and may further include: a first inductor having one end connected in series between each of a first switching element and a second switching element and an opposite end connected to one end of a primary side of the high voltage transformer; and a second inductor having one end connected between an output end of the first inductor and the one end of the primary side of the high voltage transformer and an opposite end connected between a point where each of the first capacitor for distribution and the second capacitor for distribution is connected to each other and an opposite end of the primary side of the high voltage transformer, thereby making an LLC resonance be generated for DC link voltages and transferring a resonated DC link voltage to the high voltage transformer.

The resonance converter may include:
a switching part including a first switching element to a fourth switching element of a full bridge configured to perform a switching operation complementary to each other based on a gate signal externally supplied, thereby allowing the DC link voltage to be passed therethrough; and an LC resonance part including: a first inductor having one end connected in series between each of the third switching element and the fourth switching element and an opposite end connected to one end of a primary side of the high voltage transformer; and a second inductor having one end connected between an output end of the first inductor and one end of the primary side of the high voltage transformer, and an opposite end connected between a point between each of the first switching element and the second switching element and an opposite end of the primary side of the high voltage transformer, thereby making an LC resonance be generated for DC link voltages that have passed through the switching part and transferring a resonated DC link voltage to the high voltage transformer.

The resonance converter may include: a first resonance converter; and a second resonance converter, wherein the first resonance converter may include: a first switching part provided with a plurality of switching elements, connected between one end and an opposite end of the DC link voltage, and configured to perform a complementary switching operation to each other based on a gate signal of a gate driver, thereby allowing the DC link voltage to be passed therethrough; and
  a first LC resonance part configured, by respectively connecting an inductor and a capacitor for LC resonance to an end and an opposite end of the first switching part, to convert a series link voltage into a DC voltage and then to make an LC resonance be generated for the DC link voltages,
and wherein the second resonance converter may include:
a second switching part provided with a plurality of switching elements, connected between one end and an opposite end of the DC link voltage, and configured to perform a complementary switching operation to each other based on a gate signal of a gate driver, thereby allowing the DC link voltage to be passed therethrough; and
a second LC resonance part configured, by respectively connecting an inductor and a capacitor for LC resonance to an end and an opposite end of the second switching part, to convert a series link voltage into a DC voltage and then to make an LC resonance be generated for the DC link voltages.

The high voltage transformer may include: a first high voltage transformer; and a second high voltage transformer, wherein the first high voltage transformer may be provided as a transformer for high voltage and configured to perform a phase shift and step-up for the output signal that is of a resonated frequency of a first resonance converter,
  and wherein the second high voltage transformer
    may be provided as a transformer for high voltage and configured to perform a phase shift and step-up for the output signal that is of a resonated frequency of a second resonance converter.

The DV-DC converter may include: a first DC-DC converter; and a second DC-DC converter, wherein the first DC-DC converter may be provided with a plurality of switching elements and configured to perform a complementary switching operation to each other based on a gate signal externally supplied, thereby converting an output signal of a first high voltage transformer into a DC form and transferring a converted DC form output signal to a high voltage battery,
  and wherein the second DC-DC converter may be provided with a plurality of switching elements and configured to perform a complementary switching operation to each other based on a gate signal externally supplied, thereby converting an output signal of a second high voltage transformer into a DC form and transferring a converted DC form output signal to the high voltage battery.

The DV-DC converter may include:
a fifth switching element to an eighth switching element having corresponding elements respectively connected in parallel to one end and an opposite end of a secondary side output end of the high voltage transformer and configured to perform a complementary switching operation to each other, thereby converting an output signal of the high voltage transformer into a DC form; and a capacitor for high voltage output having one end and an opposite end respectively connected between the fifth switching element and the seventh switching element and between the sixth switching element and the eighth switching element and configured to link a DC voltage, thereby transferring a linked high voltage to the high voltage battery, and may further include: a ninth switching element and a tenth switching element connected in parallel to an opposite end of a primary side of the low voltage transformer connected to the opposite end of the secondary side output end of the high voltage transformer and configured to perform a complementary switching operation to each other, thereby transferring the high voltage of the capacitor for high voltage output to the low voltage transformer.

The low voltage transformer may include:
an inductor configured to remove a leakage current connected to an opposite end of the ninth switching element; and
a transformer for low voltage having one end connected between the opposite end of the high voltage transformer and an opposite end of the switching element and an opposite end connected to an output end of the inductor and configured to perform a step-down of an output voltage of the capacitor for high voltage output, transferred through the ninth switching element and the tenth switching, based on a turns ratio and then to perform a phase shift of a stepped down output voltage. The filter may include:

a first diode and a second diode each having one output end connected to one and an opposite end, of a secondary side of the low voltage transformer, respectively, and an opposite end connected to each other in series and configured to perform half-wave rectification of the output signal of the low voltage transformer; an inductor for a first filter and an inductor for a second filter each having one end connected between the one output end of the first diode and the one end of a secondary side of the low voltage transformer and between the one output end of the second diode and an opposite end of the secondary side of the low voltage transformer, respectively, and configured to perform filtering based on a predetermined inductance for each of the output signals, which are half-wave rectified, of the first diode and the second diode; and a capacitor for low voltage output having one end connected between a point where the opposite end of each of the inductor for a first filter and the inductor for a second filter is connected to each other and one end of a low voltage battery and an opposite end connected between a point where the opposite end of each of the first diode and the second diode is connected to each other and an opposite end of the low voltage battery and configured to link output voltages of the inductor for a first filter and the inductor for a second filter of a series, thereby providing a low voltage smaller than that of the high voltage battery to the low voltage battery.

Advantageous Effects

According to an embodiment, as one leg of a switching element of an isolated DC-DC converter is shared with a secondary side of a high voltage transformer and a primary side of a low voltage transformer, a unitary charging device of the present disclosure can reduce the number of switching elements of a charging device and reduce gate drivers for operating the multiple switching elements, reduce the number of switching elements of a charging device and reduce gate drivers for operating the multiple switching elements, improve reliability thereof, and, although the number of switching elements is reduced, increase the performance of the unitary charging device.

In addition, the unitary charging device of the present disclosure can not only reduce the price and volume of the charging device but also increase efficiency by reducing the conduction loss and switching loss, due to the shared use of an EMI filter and an input capacitor of a high voltage battery.

DESCRIPTION OF DRAWINGS

The following drawings attached to the present specification illustrate exemplary embodiments of the present disclosure and serve to further understand the technical spirit of the present disclosure along with the detailed description of the present disclosure to be described later, so the present disclosure should not be construed as being limited only to a matter described in such drawings.

BEST MODE

Figure 1:
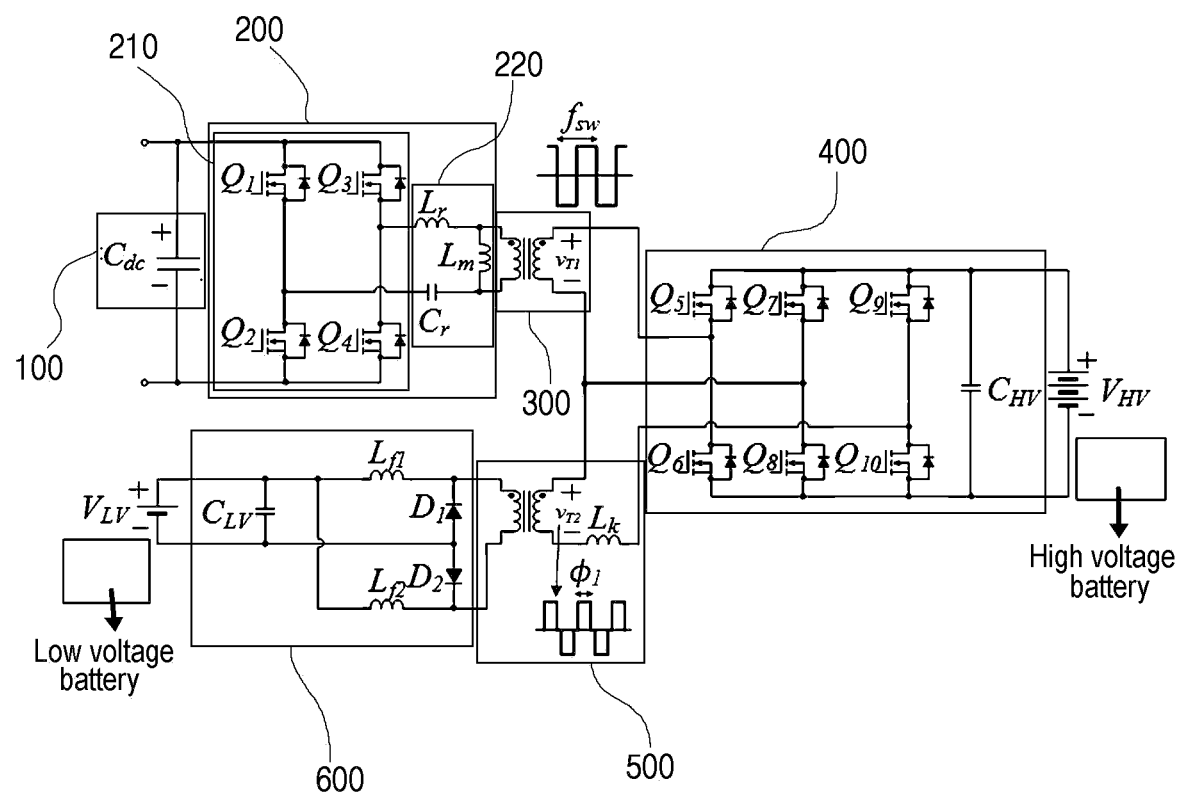
FIG. 1 is a configuration diagram of a unitary charging device for low and high voltages of an embodiment.

Hereinafter, an exemplary embodiment of the present disclosure will be described in detail with reference to accompanying drawings.

Advantages and features of the present disclosure and methods of achievement thereof will become apparent with reference to the embodiments described below in conjunction with the accompanying drawings. However, the present disclosure is not limited to the embodiments disclosed below but may be implemented in various different forms, and the present embodiments are provided only to make the disclosure of the present disclosure to be complete and to fully inform those of ordinary skill in the art to which the present disclosure belongs. In addition, the present disclosure is only defined by the scope of the claims.

Terms used in the present specification will be briefly described, and the present disclosure will be described in detail.

The terms used in the present disclosure have been selected as much as possible as general terms currently widely used while considering the functions in the present disclosure but may vary depending on the intention or precedent of a person skilled in the art, the emergence of new technology, and the like. In addition, in a specific case, terms arbitrarily selected by the applicant may be used, and in this case, the meaning will be described in detail in a corresponding description part of the invention. Therefore, the terms used in the present disclosure should be defined on the basis of the meaning of the terms and the overall content of the present disclosure rather than the meaning of the name of a simple term.

Hereinafter, with reference to the accompanying drawings, embodiments of the present disclosure will be described in detail so that those skilled in the art may easily implement the present disclosure. In addition, in order to clearly explain the present disclosure in the drawings, parts irrelevant to the description will be omitted.

Hereinafter, a unitary charging device for low and high voltages according to an embodiment of the present disclosure will be described in detail with reference to the accompanying drawings.

Figure 2:
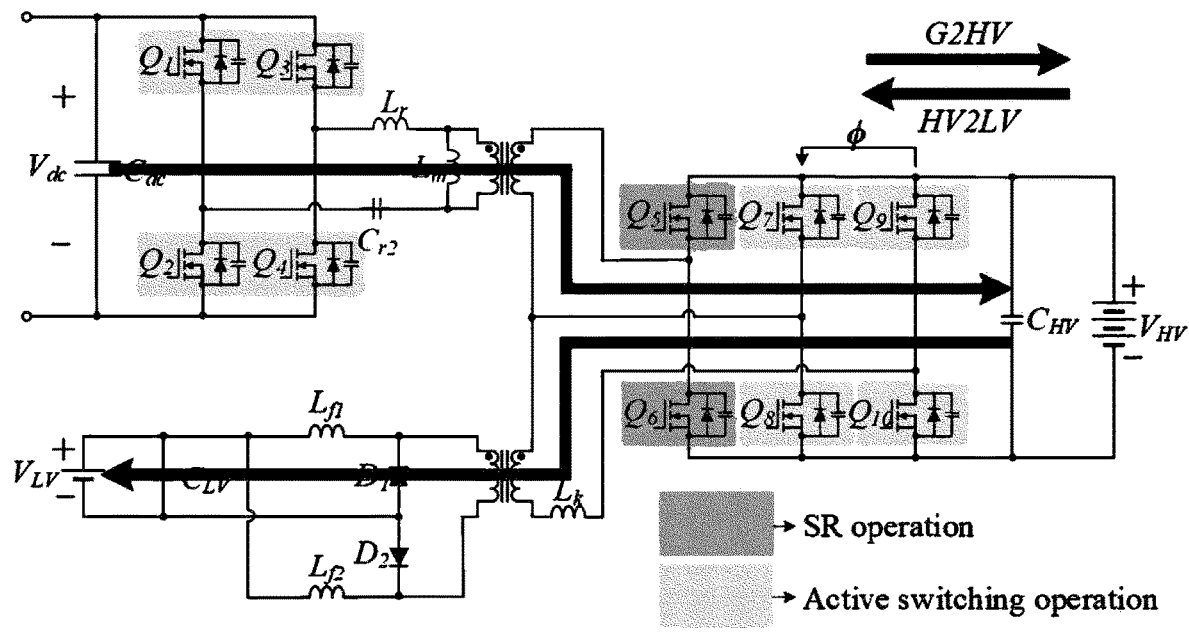
FIG. 2 is a diagram illustrating a simultaneous charging operation of low and high voltage batteries of the embodiment.
Figure 3:
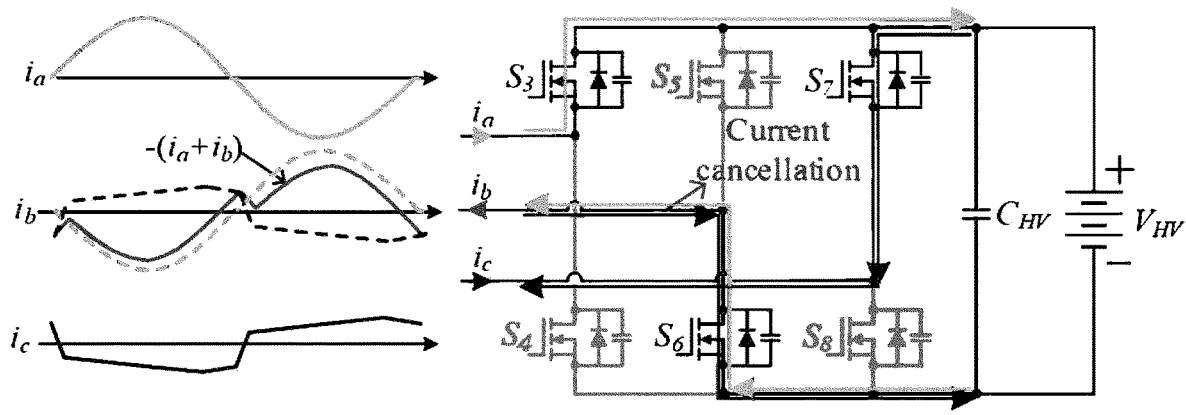
FIG. 3 is a configuration diagram of a charging device for reducing switching loss of the embodiment.
Figure 4:
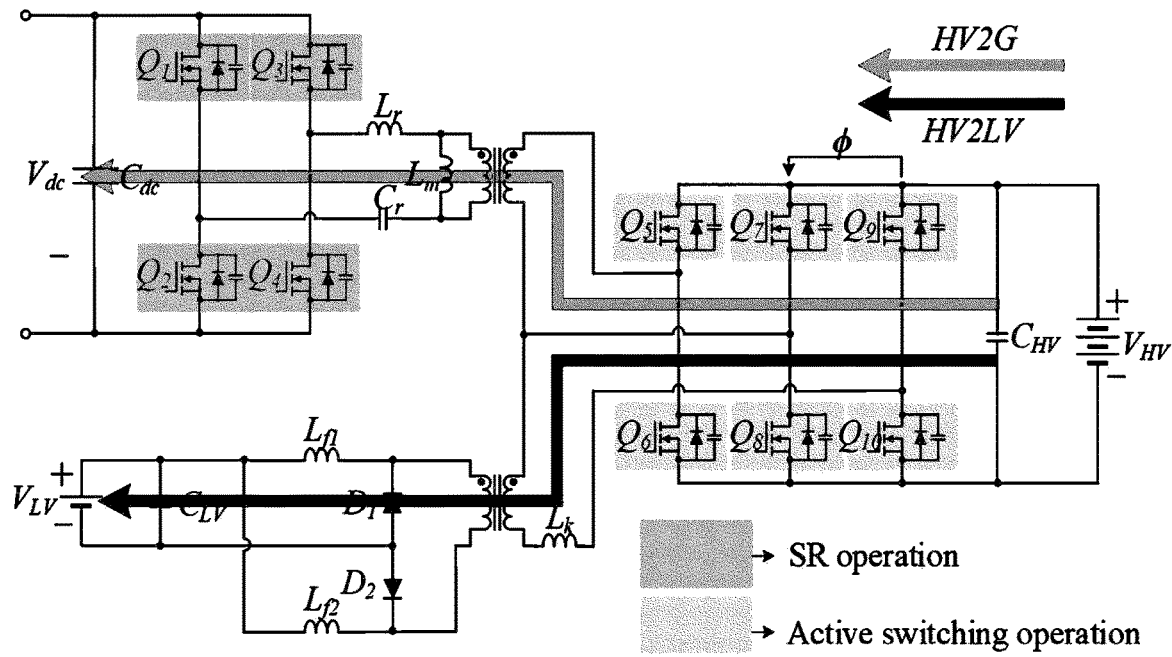
FIG. 4 is a diagram of an operation of discharging the high voltage battery and charging the low voltage battery of the exemplary embodiment.
Figure 5:
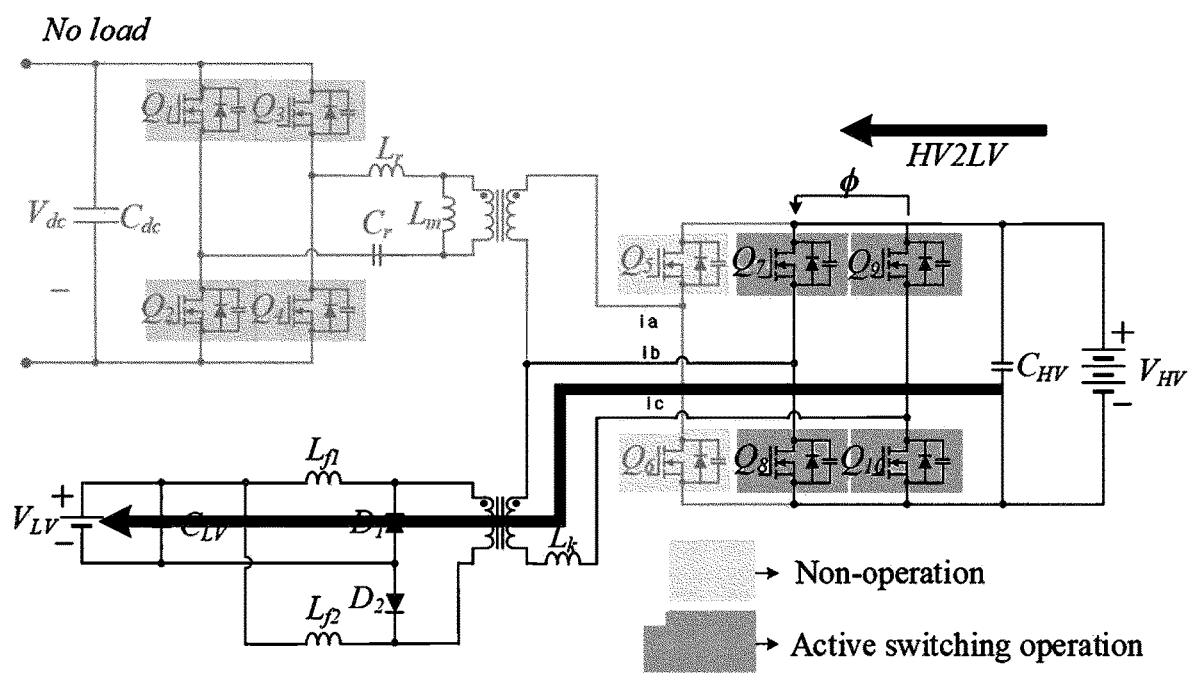
FIG. 5 is an exemplary diagram illustrating an operation of charging the low voltage battery of the embodiment.
Figure 6:
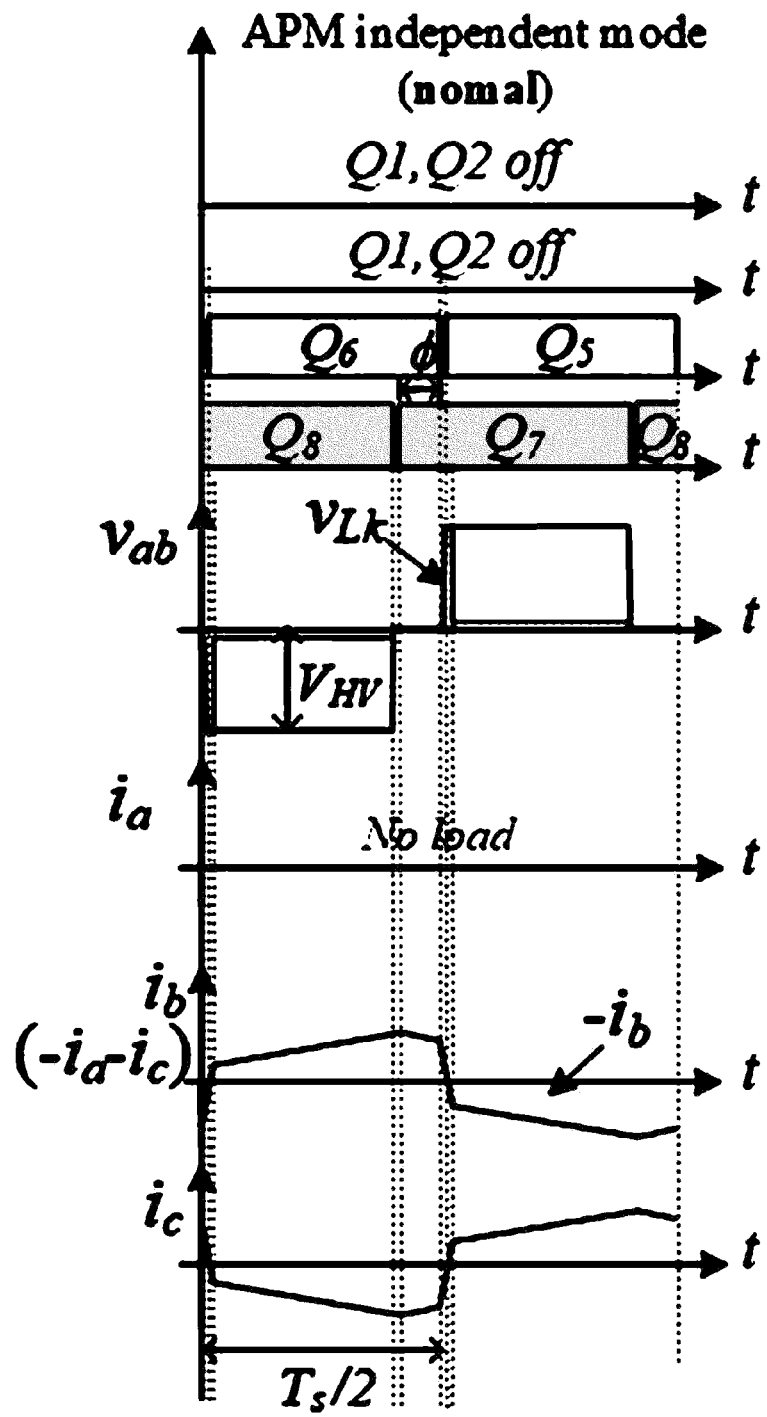
FIG. 6 is an operation waveform diagram of a low voltage battery charging mode of an exemplary embodiment.

FIG. 1 is an overall configuration diagram of a unitary charging device for low and high voltages of an embodiment, FIG. 2 is a diagram illustrating a simultaneous charging operation of the charging device of FIG. 1, FIG. 3 is a configuration diagram illustrating a reduction of a switching loss of the charging device of FIG. 1, FIG. 4 is a diagram of an operation of discharging the high voltage battery and charging the low voltage battery, FIG. 5 is an exemplary diagram illustrating an operation of charging the low voltage battery of the charging device of FIG. 1, and FIG. 6 is an operation waveform diagram of switching elements during an operation of charging the low voltage battery of the charging device of FIG. 1.

With reference to FIGS. 1 to 6, the unitary charging device for low and high voltages is provided to charge at least one of the low voltage and high voltage batteries by sharing one leg of a secondary-side switching element of an insulated DC-DC converter of the high voltage battery and a primary-side switching element of the low voltage battery. Accordingly, the unitary charging device for low and high voltages may include at least one out of a DC link 100, a resonance converter 200, a high voltage transformer 300, a DC-DC converter 400, a low voltage transformer 500, and a filter 600.

Here, the DC link 100 is provided as a capacitor $C_{dc}$ and is configured to convert AC power externally supplied into a DC form by an inverter (not shown) and then to link converted DC power to the resonance converter 200. In an embodiment, the inverter is the same as or similar to the configuration of a general inverter provided with a plurality of switching elements that perform switching operations complementary to each other, and thus a detailed description thereof will be omitted.

Accordingly, the resonance converter 200 is configured to allow the DC link voltage to be resonated based on an LLC resonance circuit connected to an output terminal of the DC link 100 and to transfer an output signal of a resonance frequency and in accordance therewith, includes a switching part 210 and an LLC resonance part 220.

Here, the switching part 210 includes, as an example, a first switching element S1 to a fourth switching element S4 of a full bridge and is configured to perform a complementary switching operation to each other based on a gate signal externally supplied, thereby transferring the DC link voltage $V_{dc}$ to the LLC resonance part 220.

A configuration configured to perform a switching operation complementary to each other based on a gate signal of a gate driver externally supplied with respect to the first switching element S1 to the fourth switching element S4 of a full-bridge of the switching part 210 has already been applied to a general charger. Therefore, even though the first switching element S1 to the fourth switching element S4 are not specifically specified in the present specification, the above configuration should be understood at a level of those skilled in the art.

Meanwhile, the LLC resonator 220 includes a first inductor Lr and a first capacitor Cr each correspondingly connected in series to each of output terminals of the first switching element S1 to the fourth switching element S4, and a second inductor Lm connected between the first inductor Lr and the first capacitor Cr, thereby LLC resonating the DC link voltage having passed through the switching part 210 to transfer a resonated DC link voltage to the high voltage transformer 300.

The high voltage transformer 300 is provided as a transformer, is installed at an output terminal of the second inductor Lm, and is configured to step up an output signal of a resonance frequency of the LLC resonance part 220 based on a turns ratio and to perform a function of transferring a stepped-up output signal to the DC-DC converter 400. Here, the turns ratio of the primary side and the secondary side of the high voltage transformer 300 may be determined based on the capacity of the high voltage battery.

The DC-DC converter 400 is provided to be connected to a secondary side of the high voltage transformer, to be configured to convert an output signal of the high voltage transformer into a DC voltage, then link DC voltages, and charge a linked DC voltage to the high voltage battery. Accordingly, the DC-DC converter 400 may include a fifth switching element S5 to a tenth switching element S10 and a capacitor $C_{HV}$ for high voltage output.

Here, the fifth switching element S5 to the eighth switching element S8 have a structure connected in parallel to the one terminal and an opposite terminal of the secondary output terminal of the high voltage transformer, respectively, and the seventh switching element S7 and the eighth switching element S8 are connected to one terminal of a primary side of the low voltage transformer 500.

Here, the fifth switching element S5 to the eighth switching element S8 are configured to transfer the output signal of the high voltage transformer 300 to the capacitor $C_{HV}$ for high voltage output based on a switching operation complementary to each other based on a gate signal externally supplied. The high voltage battery is charged with the charging voltage of the capacitor $C_{HV}$ for high voltage output.

In addition, as the ninth switching element S9 and the tenth switching element S10 are connected in parallel to the opposite terminal of the primary side of the low voltage transformer 500, and as the leg of the seventh switching element S7 and the eighth switching element S8 is shared with the opposite terminal of the secondary side of the high voltage transformer 300 and the one terminal of the primary side of the low voltage transformer 500, the seventh switching element S7 to the tenth switching element S10 are configured to perform a switching operation complementary to each other, and in accordance therewith, the output voltage of the capacitor $C_{HV}$ for high voltage output is transferred to the low voltage transformer 500.

The low voltage transformer 500 includes a transformer having one terminal of the primary side connected to an opposite terminal of the seventh switching element S7 and an opposite terminal of the primary side connected to an opposite terminal of the ninth switching element S9 and may further include an inductor Lk, which is connected to the opposite terminal of the ninth switching element S9 and the opposite terminal of the primary side for removing leakage.

Accordingly, the low voltage transformer 500 may perform a function of shifting a phase of the output voltage of the capacitor $C_{HV}$ for high voltage output of the DC-DC converter 400 based on the transformer and of stepping down the DC voltage based on the turns ratio. At this time, the leakage current generated by the transformer is removed based on the leakage removal inductor Lk.

In addition, the filter 600 is connected to the secondary side of the low voltage transformer 500. Here, the filter 600 includes a first diode D1 and a second diode D2 connected in series between one terminal and an opposite terminal of the secondary side of the low voltage transformer 500 and configured to perform half-wave rectification of the output signal of the low voltage transformer 500.

In addition, the filter 600 may further include an inductor $L_{f1}$ for a first filter and an inductor $L_{f2}$ for a second filter, respectively connected between an output terminal of the first diode D1 and one terminal of the secondary side of the transformer of the low voltage transformer 500 and between an output terminal of the second diode D2 and the opposite terminal of the secondary side of the transformer of the low voltage transformer 500 and configured to perform filtering based on a predetermined inductance for each of the output signals, which are half-wave rectified, of the first diode D1 and the second diode D2.

A capacitor $C_{LV}$ for low voltage output is connected between the output terminals of the inductor $L_{f1}$ for the first filter and the inductor $L_{f2}$ for the second filter. Here, the capacitor $C_{LV}$ for low voltage output links an output voltage of each of the inductors $L_{f1}$ and $L_{f2}$ of a series to provide a linked output voltage to the low voltage battery. Here, the low voltage is a low voltage that is smaller than the charging capacity of the high voltage battery and is the charging capacity of the low voltage battery.

Hereinafter, simultaneous charging mode for the high voltage battery and low voltage battery will be described with reference to FIG. 2.

The first switching element S1 to the fourth switching element S4 of the switching part 210 are configured to operate complementary to each other based on a gate signal of a gate driver externally supplied, whereby the serial link voltage Vdc is transferred to the LLC resonance part 220, the DC link voltage Vdc resonates based on the LLC resonance part 220 to generate an output signal of a resonance frequency, and the output signal is transferred to the primary side of the high voltage transformer 300.

The high voltage transformer 300 steps up the output signal in the form of a resonance frequency and transfers a stepped up voltage to those of the fifth switching element S5 to the eighth switching element S8 of the DC-DC converter 400. In addition, the fifth switching element S5 to the eighth switching element S8 are switched complementary to each other based on the gate signal of the gate driver externally supplied to output a high voltage of direct current.

The capacitor $C_{HV}$ for high voltage output supplied with such a high voltage is configured to link the high voltage and transfer a linked high voltage to the high voltage battery, and the high voltage battery is charged with the linked high voltage.

In addition, the high voltage of the capacitor $C_{HV}$ for high voltage output is transferred to the primary side of the low voltage transformer 500 based on the seventh switching element S7 to the tenth switching element S10, and the link voltage of the primary side of the low voltage transformer 500 is stepped down while being subjected to a phase shift, based on the transformer. At this time, the phase of the high voltage of the capacitor $C_{HV}$ for high voltage output is changed based on the complementary switch operation of the seventh switching element S7 to the tenth switching element S10, and the high voltage of the capacitor $C_{HV}$ for high voltage output having the changed phase is transferred to the primary side of the transformer of the low voltage transformer 500. In addition, the step-down of the high voltage of the capacitor $C_{HV}$ for high voltage output is made based on the turns ratio of the primary side and the secondary side of the transformer of the low voltage transformer 500.

In addition, the output signal of the low voltage transformer 500 is filtered based on the first diode D1 and the second diode D2, and the first filter inductor $L_{f1}$ and the second filter inductor $L_{f2}$, of the filter 600, and is converted into a direct current. In this case, a DC type low voltage has a value lower than the link voltage of the capacitor $C_{HV}$ for high voltage output.

Such a DC type voltage is linked based on the capacitor $C_{LV}$ for low voltage output and transferred to the low voltage battery, and the low voltage battery is charged with the DC type low voltage.

With reference to FIG. 3, In one embodiment, as one leg of the switching element of the isolated DC-DC converter is shared by the secondary side of the high voltage transformer and the primary side of the low voltage transformer, it may be seen that, when charging low and high voltages at the same time, an input current $i_b$ of one terminal of the primary side of the low voltage transformer 500 is a difference between a secondary-side current $i_a$ of the high voltage transformer 300 and an input current $i_c$ of an opposite terminal of the primary side of the low voltage transformer 500. Accordingly, it may be seen that a switching loss due to an offset of the primary side input current $i_b$ of a transformer for low voltage is reduced in a simultaneous charging mode for low and high voltages.

Meanwhile, a process of performing modes of discharging the high voltage battery and charging the low voltage battery will be described with reference to FIG. 4.

The high voltage of the capacitor $C_{HV}$ for high voltage output charged in the high voltage battery is stepped down by passing through a path, which consists of the fifth switching element S5 to the tenth switching element S10 of the DC-DC converter 400 configured to be switched to a turn-on state, the high voltage transformer 300, and the LLC resonance part 200, thereby being transferred to the DC link 100.

In addition, the high voltage of the capacitor $C_{HV}$ for high voltage output charged into the high voltage battery is subjected to the phase shift and stepped down by passing through a path, which consists of the fifth switching element S5 to the tenth switching element S10, the low voltage transformer 500, and the filter 600, thereby being charged into the low voltage battery.

Here, a process of step-up and step-down of a voltage according to the turns ratio by accumulating energy and emitting the accumulated energy based on each transformer of the high voltage transformer 300 and the low voltage transformer 500 is a configuration already applied to a charger. Therefore, even though not specifically specified herein, the above process should be understood at a level of those skilled in the art.

Meanwhile, a charging mode of the low voltage battery will be described with reference to FIGS. 5 and 6.

The high voltage of the capacitor $C_{HV}$ for high voltage output is transferred to the primary side of the low voltage transformer 500 based on the seventh switching element S7 to the tenth switching element S10, and a/the link voltage of the primary side of the low voltage transformer 500 is stepped down while being subjected to a/the phase shift. Here, the seventh switching element S7 and the eighth switching element S8, and the ninth switching element S9 and the tenth switching element S10 have a phase difference Φ and are switched complementary to each other.

Accordingly, the phase of the high voltage of the capacitor $C_{HV}$ for high voltage output is changed based on the complementary switch operation of the seventh switching element S7 to the tenth switching element S10, and the high voltage of the capacitor $C_{HV}$ for high voltage output having the changed phase is transferred to the primary side of the transformer of the low voltage transformer 500.

The step-down of the high voltage of the capacitor $C_{HV}$ for high voltage output is made based on the turns ratio of the primary side and the secondary side of the transformer of the low voltage transformer 500.

Accordingly, the secondary side current $i_a$ of the high voltage transformer 300 is 0, and the input current $i_b$ of one terminal of the primary side of the low voltage transformer 500 is the difference between the secondary side current $i_a$ of the high voltage transformer 300 and the input current $i_c$ of the opposite terminal of the primary side of the low voltage transformer 500, linearly increases in a positive direction when the eighth switching element S8 and the tenth switching element S10 are turned on, but linearly decreases when the ninth switching element S9 is switched to a turned-on state.

In addition, when the seventh switching element S7 and the ninth switching element S9 are in a turned-on state, the phase is shifted, so that the input current ib of the primary side of the low voltage transformer 500 is reduced in a negative direction.

In addition, the input current $i_c$ of the opposite terminal of the primary side of the low voltage transformer 500 is linearly decreased and then increased, in an opposite direction of the input current ib of the primary terminal of the low voltage transformer 500.

In addition, an output signal of the low voltage transformer 500 is filtered based on the first diode D1 and the second diode D2, and the first filter inductor $L_{f1}$ and the second filter inductor $L_{f2}$, of the filter 600, and is converted into a DC form. At this time, the DC type low voltage has a lower value than the link voltage of the capacitor $C_{HV}$ for high voltage output.

Such a DC type voltage is linked based on the capacitor $C_{LV}$ for low voltage output and transferred to the low voltage battery, and the low voltage battery is charged with the DC type low voltage.

Figure 7:
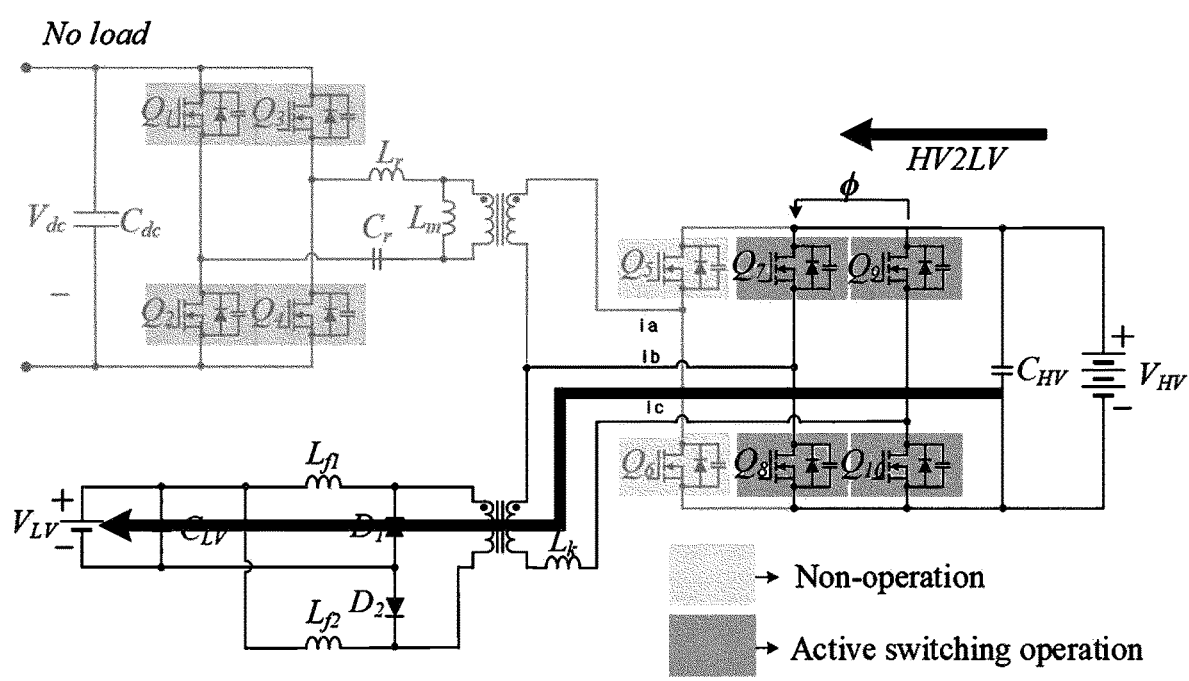
FIG. 7 is another exemplary diagram illustrating the operation of charging the low voltage battery of the embodiment.
Figure 8:
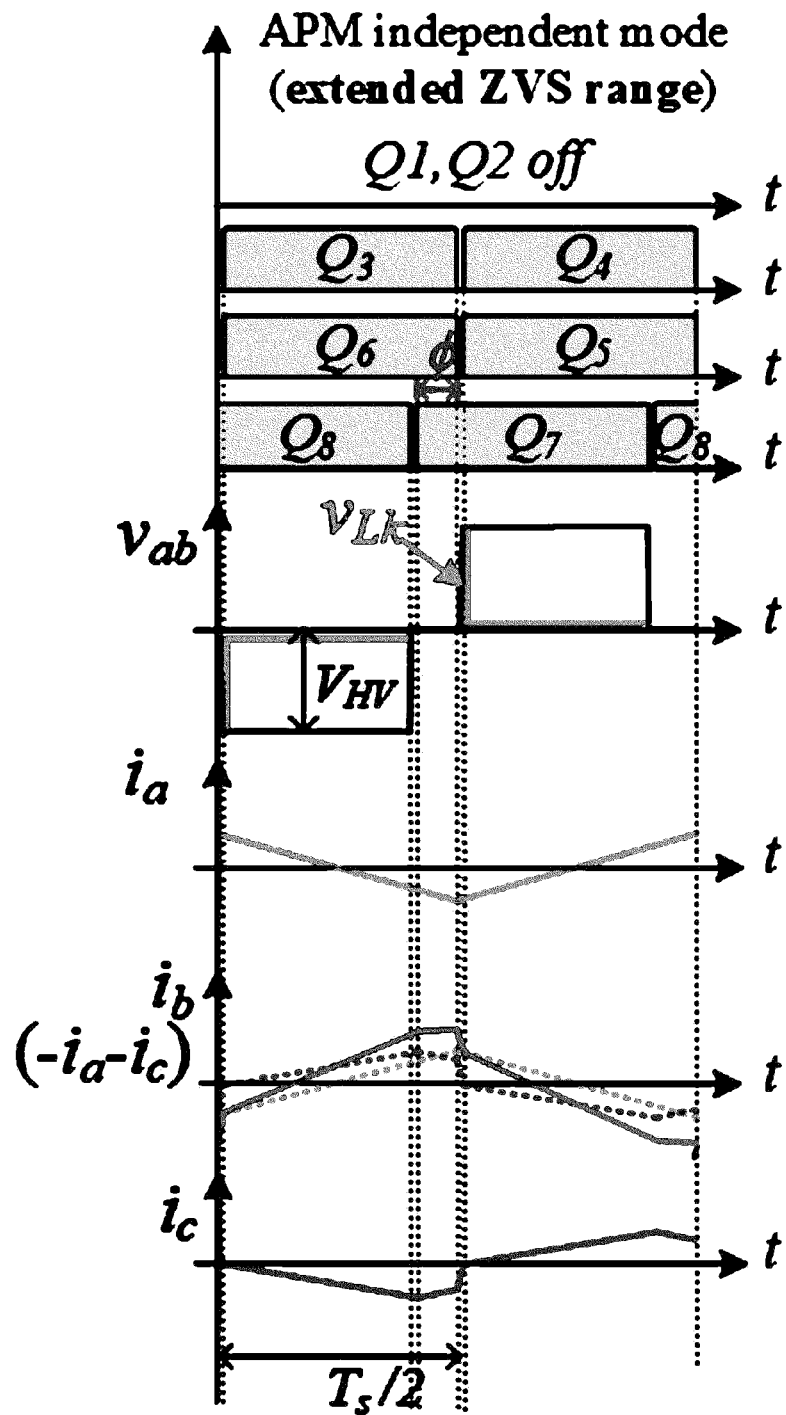
FIG. 8 is an operation waveform diagram of a low voltage battery charging mode of an exemplary embodiment.

FIG. 7 is another exemplary diagram of a charging mode of the low voltage battery shown in FIG. 5, and FIG. 8 is an output waveform diagram of another exemplary diagram of the low voltage charging mode of FIG. 6. With reference to FIGS. 7 and 8, the high voltage of the capacitor $C_{HV}$ for high voltage output is transferred to the primary side of the low voltage transformer 500 based on the seventh switching element S7 to the tenth switching element S10, and the high voltage of the primary side of the low voltage transformer 500 is stepped down while being subjected to a phase shift based on the transformer a low voltage. At this time, the first switching elements S1 to the fourth switching element S4 of the switching part 210 of the LLC converter 200 are maintained in a turned-off state.

At this time, the phase of the high voltage of the capacitor $C_{HV}$ for high voltage output is changed based on the complementary switch operation of the fifth switching element S5 to the tenth switching element S10, and the high voltage of the capacitor $C_{HV}$ for high voltage output having a changed phase is transferred to the primary side of the transformer.

In addition, the step-down of the high voltage of the capacitor $C_{HV}$ for high voltage output is made based on the turns ratio of the primary side and the secondary side of the transformer for low voltage of the low voltage transformer 500.

Accordingly, the secondary side current $i_a$ of the high voltage transformer 300 is linearly decreased when the fifth switching element S5 is switched to the turned-off state but linearly increased when the sixth switching element S6, which is complementary to the fifth switching element S5, is switching to a turned-on state.

An input current ib of one terminal of the primary side of the low voltage transformer 500 is a difference between a secondary-side current $i_a$ of the high voltage transformer 300 and an input current $i_c$ of an opposite terminal of a primary side of the low voltage transformer 500, linearly increases in a positive direction when the eighth switching element S8 and the tenth switching element S10 are turned on, but linearly decreases when the ninth switching element S9 is switched to a turned-on state.

In addition, when the seventh switching element S7 and the ninth switching element S9 are in a turned-on state, the phase is shifted, so that the input current $i_b$ of the primary side of the low voltage transformer 500 is reduced in a negative direction.

With reference to FIG. 8, it may be seen that soft switching of the input current $i_b$ is performed through a zero voltage switching operation based on the inductor Lm, and the soft switching range is extended.

In addition, it may be checked that the input current $i_c$ of the opposite terminal of the primary side of the transformer for low voltage of the low voltage transformer 500 is linearly decreased and then increased, in the opposite direction of the input current $i_b$ of the primary side of the low voltage transformer 500, based on the zero voltage switching operation of the ninth switching element S9 and the tenth switching element S10.

In addition, the output signal of the low voltage transformer 500 is filtered based on the first diode D1 and the second diode D2, and the first filter inductor $L_{f1}$ and the second filter inductor $L_{f2}$, of the filter 600, and is converted into direct current. In this case, the DC type low voltage has a lower value than the link voltage of the high voltage output capacitor $C_{HV}$.

The DC type voltage is linked based on the capacitor $C_{LV}$ for low voltage output and transferred to the Low voltage battery, and the low voltage battery is charged with the DC type low voltage.

Here, the high voltage is collectively referred to as the voltage charged to the battery of the electric vehicle of 200 V~400 V, and the low voltage refers to the voltage for operating electrical equipment such as lamps of electric vehicles of 9 V to 16 V. However, the scope of protection of the present disclosure is not limited by common names related to the concept of low and high.

Figure 9:
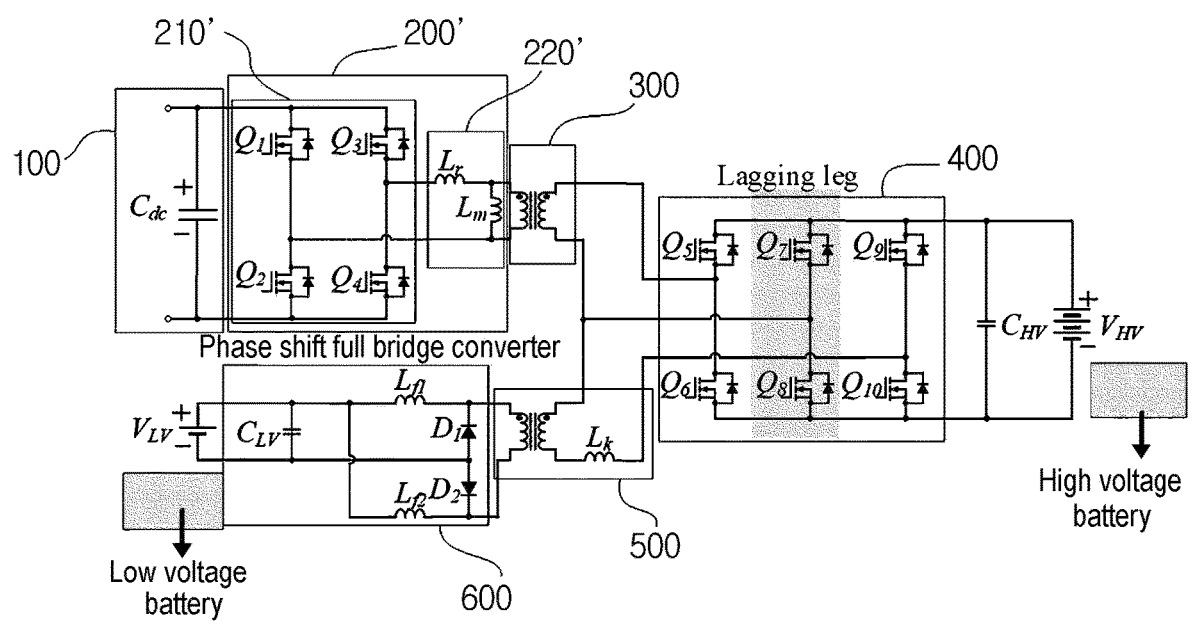
FIG. 9 is a configuration diagram of a unitary charging device for low and high voltages of another embodiment.
Figure 10:
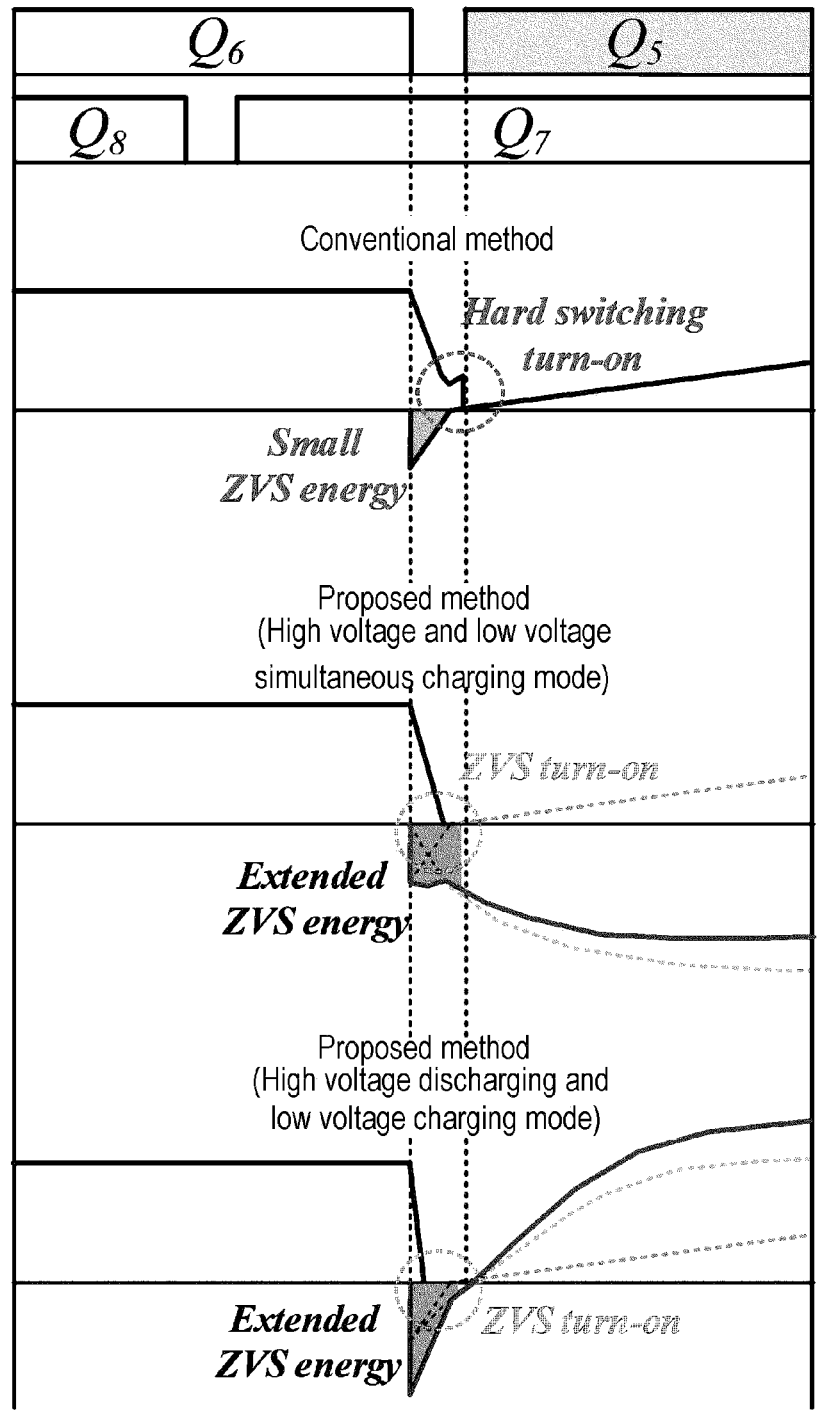
FIGS. 10 and 11 are operation waveform diagrams of a low voltage battery charging mode of another embodiment.
Figure 11:
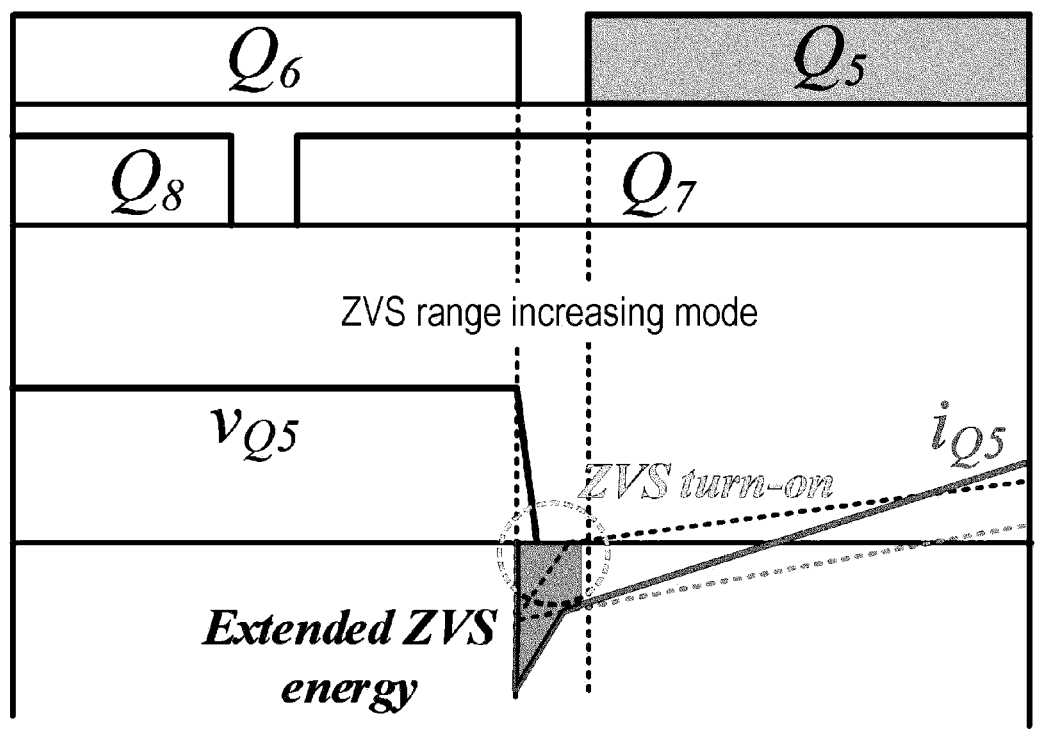

FIG. 9 is a view illustrating another embodiment of a unitary charging device for low and high voltages, FIG. 10 is an operation waveform diagram when the charging device of FIG. 9 is simultaneously charged with high voltage and low voltage, and FIG. 11 is an operation waveform diagram when high voltage discharging and low voltage charging of the charging device of FIG. 9 are performed.

With reference to FIGS. 9 to 11, the unitary charging device for low and high voltages has a configuration same as or similar to the unitary charging device for low and high voltages of FIG. 1, wherein a resonance converter 200' is configured to allow a DC link voltage to be resonated based on an LC resonance circuit connected to an output terminal of the DC link 100 and transfer an output signal of a resonance frequency, and accordingly, includes a switching part 210' and an LC resonance part 220'.

That is, with reference to FIG. 9, the switching part 210' includes, as an example, a first switching element S1 to a fourth switching element S4 of a full bridge and is configured to perform a switching operation complementary to each other based on a switching signal externally supplied, thereby transferring the DC link voltage Vd to the LC resonance part 220'.

In addition, the LC resonance part 220' includes a first inductor Lr and a second inductor Lm respectively connected in series to an opposite terminal of the third switching element S3 and an opposite terminal of the first switching element S1 and is configured to perform LC resonance with respect to the DC link voltage that has passed through the switching part 210', thereby transferring a resonated DC link voltage to the high voltage transformer 300'.

Accordingly, with reference to FIGS. 10 and 11, in a simultaneous charging mode for low and high voltages, in a high voltage discharging and low voltage charging mode, and in a low voltage charging mode, it may be checked that the switching operation of the fifth switching element S5 and the sixth switching element S6 of the DC-DC converter 400 is performed by the zero voltage switching control based on the switching part 210' and the LC resonance part 220'.

Figure 12:
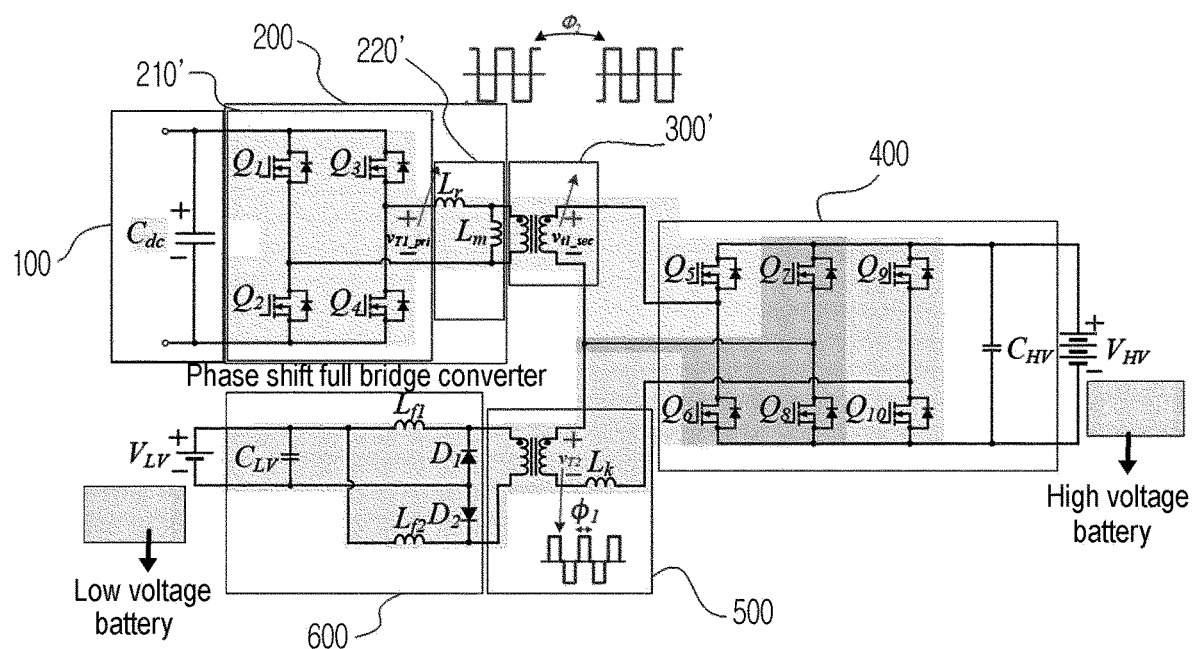
FIG. 12 is a configuration diagram of a unitary charging device for low and high voltages of still another embodiment.

FIG. 12 is a view illustrating another embodiment of the resonance converter 200' in FIG. 9 and a charging device may include at least one out of a DC link 100, a resonance converter 200", a high voltage transformer 300, a DC-DC converter 400, a low voltage transformer 500, and a filter 600, wherein the high voltage transformer 300 is configured to perform a function of making the phase shift and step-up of the output signal of a resonance frequency of the LC resonance part 220', thereby transferring an output signal that is phase shifted and stepped up to the DC-DC converter 400.

Such a series of processes of making the phase shift and step-up is the function of making/performing the phase shift and step-up performed by the above-described low voltage transformer 500, so a detailed quotation thereof will be omitted.

In addition, since the DC-DC converter 400, the low voltage transformer 500, and the filter 600 are functions performed by the DC-DC converter 400, the low voltage transformer 500, and the filter 600 shown in FIG. 12, therefore, even though not specifically specified in the present specification, it should be understood at a level of those skilled in the art.

Figure 13:
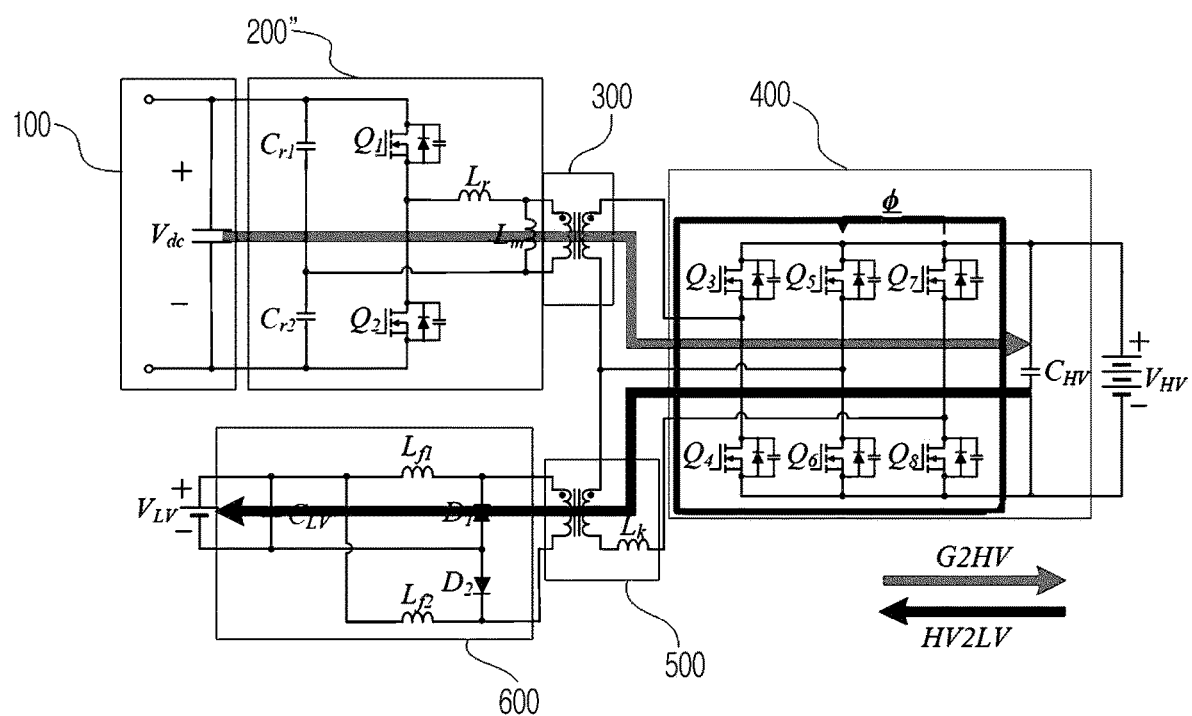
FIG. 13 is a configuration diagram of a unitary charging device for low and high voltages of still another embodiment.

FIG. 13 is another embodiment of the resonance converter 200" of FIG. 12. With reference to FIG. 13, the resonance converter 200" includes: first and second capacitors for distribution Cr1 and Cr2 configured to distribute the DC link voltage; first and second switching elements of a half-bridge; and a first inductor Lr and a second inductor Lm connected in series between a node of output terminals of the first switching device S1 and the second switching device S2 and an output terminal of the capacitor for distribution Cr1, thereby LLC resonating the DC link voltage to transfer a resonated DC link voltage to the high voltage transformer.

Accordingly, the DC link voltage is resonated based on the capacitors Cr1 and Cr2 for distribution connected to the output terminal of the DC link 100, and the inductors Lr and Lm, and the output signal in the form of a resonance frequency is transferred to the DC-DC converter 400.

Here, the high voltage transformer 300, the DC-DC converter 400, the low voltage transformer 500, and the filter 600 in FIG. 13 have configurations the same as or similar to those of the configuration of the high voltage transformer 300, the DC-DC converter 400, the low voltage transformer 500, and the filter 600 illustrated in FIG. 12, respectively, therefore, even though not specifically specified in the present specification, it should be understood at a level of those skilled in the art.

Figure 14:
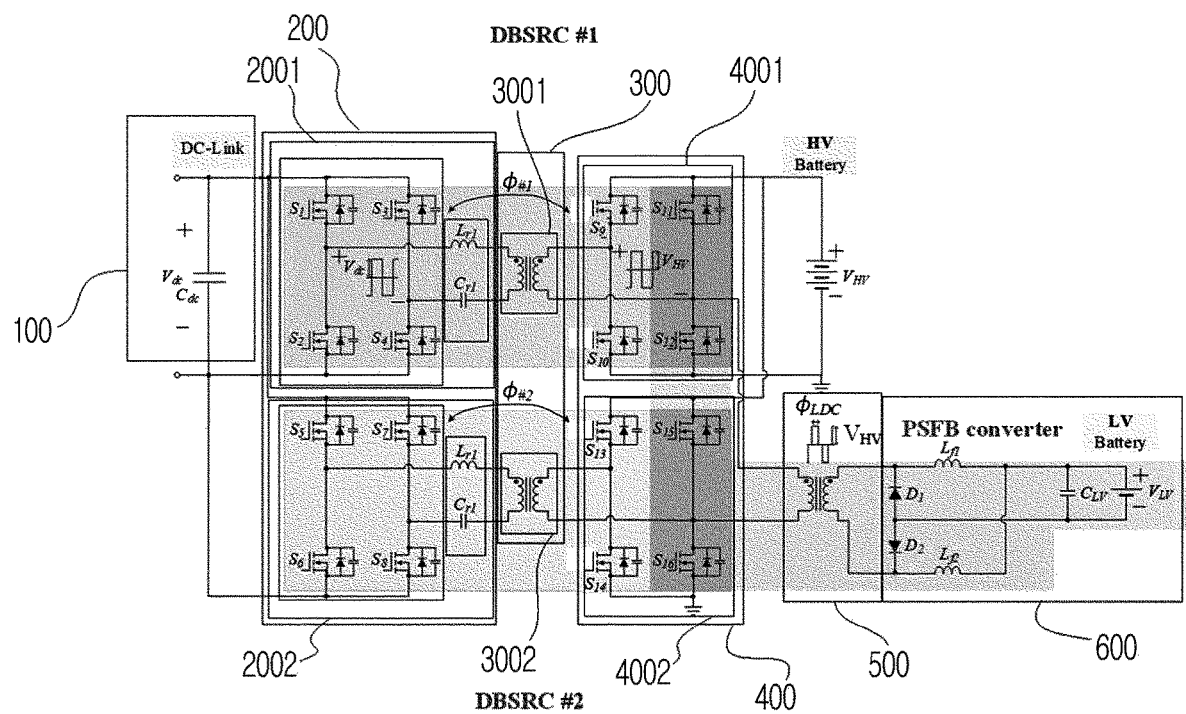
FIG. 14 is a configuration diagram of a unitary charging device for low and high voltages of still another embodiment.

FIG. 14 is a view illustrating a configuration of a unitary charging device for low and high voltages of still another embodiment. With reference to FIG. 14, the unitary charging device for low and high voltages may include at least one of a first resonance converter 2001 and a second resonance converter 2002, a first high voltage transformer 3001 and a second high voltage transformer 3002, a first DC-DC converter 4001 and the second DC-DC converter 4002, and a low voltage transformer 500 and a filter 600.

Here, the first resonance converter 2001 is provided with an eleventh switching element S11 to a fourteenth switching element S14 connected between one terminal and an opposite terminal of the DC link voltage and configured to perform complementary switching operations to each other based on a gate signal of a gate driver and includes an inductor Lr11 and a capacitor Cr11, for LC resonance, respectively connected to an opposite terminal of each of the eleventh switching element S11 and the thirteenth switching element S13, thereby converting a series link voltage into a DC voltage, then performing LC resonance with respect to the converted DC voltage, and transferring a resonated DC voltage to the first high voltage transformer 3001.

The first high voltage transformer 3001 is provided as a transformer for high voltage and configured to perform the phase shift and step-up for the output signal that is of a resonated frequency, thereby transferring a phase-shifted and stepped-up output signal to the first DC-DC converter 4001. Here, a process of the phase shift of the transformer for high voltage according to a mutual switching operation of the eleventh switching element S11 to the fourteenth switching element S14 and a process of step-up based on a primary and secondary side turns ratio of the transformer for high voltage are the same as or similar to the process of the phase shift and the process of step-down based on the turns ratio of the low voltage transformer 500 illustrated in shown in FIG. 1, therefore it is not specifically specified in the present specification, it should be understood at a level of those skilled in the art.

The second resonance converter 2002 is provided with a fifteenth switching element S15 to an eighteenth switching element S18 connected between the one terminal and the opposite terminal of the DC link voltage and configured to perform complementary switching operations to each other based on a gate signal of a gate driver and includes an inductor Lr12 and a capacitor Cr12, for LC resonance, respectively connected to opposite terminals of the fifteenth switching element S15 and a seventeenth switching element S17, thereby converting a series link voltage into a DC voltage and then performing LC resonance with respect to the converted DC voltage and transferring a resonated DC voltage to the second high voltage transformer 3001.

The second high voltage transformer 3002 is provided as a transformer for high voltage and performs the phase shift and step-up for the output signal that is in the form of a resonated frequency, thereby transferring a phase-shifted and stepped-up output signal to the second DC-DC converter 4002. Here, a process of the phase shift of the transformer for high voltage according to a mutual switching operation of the fifteenth switching element S15 to the eighteenth switching element S18 and a process of step-up based on a primary and secondary side turns ratio of the transformer for high voltage are the same as or similar to the process of the phase shift and the process of step-down based on the turns ratio of the low voltage transformer 500 illustrated in shown in FIG. 1, therefore it is not specifically specified in the present specification, it should be understood at a level of those skilled in the art.

In addition, a low voltage transformer 500 and a filter 600 have the configuration and function which are the same as those of the low voltage transformer 500 and the filter 600 described above in FIG. 1, so a detailed references thereof will be omitted.

Although the present disclosure has been described in detail through representative embodiments above, those of ordinary skill in the art to which the present disclosure pertains will understand that various modifications are possible without departing from the scope of the present disclosure, with respect to the above-described exemplary examples. Therefore, the scope of the present disclosure should not be limited to the described embodiments but should be defined by all changes or modifications derived from equivalent concepts of claims as well as the claims to be described later.

The invention claimed is:

1. A unitary charging device for low and high voltages, the device comprising:
    a DC link, for linking DC power converted with respect to AC power externally supplied, to output a DC link voltage
    a resonance converter connected to an output terminal of the DC link, for resonating the DC link voltage to transfer an output signal of a frequency resonated;
    a high voltage transformer connected to an output terminal of the resonance converter, for stepping up the output signal of the resonance converter to a higher voltage based on a turns ratio thereof; and
    a DC-DC converter connected to a secondary side of the high voltage transformer, for converting an output signal of the high voltage transformer into a DC voltage and then link the DC voltage to a high voltage battery to charge the high voltage battery;
    a low voltage transformer connected to the DC-DC converter, for shifting a phase of the DC voltage of the DC-DC converter to step down the DC voltage to a lower voltage based on a turns ratio thereof; and
    a filter for filtering an output signal of the low voltage transformer,
    wherein the secondary side of the high voltage transformer includes a first terminal and a second terminal, and a primary side of the low voltage transformer includes a first terminal and a second terminal,
    wherein the second terminal of the secondary side of the high voltage transformer is directly connected to the first terminal of the primary side of the low voltage transformer.

2. The device of claim 1, wherein the resonance converter comprises:
    a switching part including a first switching element to a fourth switching element of a full bridge for performing a switching operation complementary to each other based on a gate signal externally supplied to pass the DC link voltage; and
    an LLC resonance part including:
    a first inductor and a first capacitor each correspondingly connected in series to each of output terminals of the first switching element to the fourth switching element; and
    a second inductor connected between the first inductor and the first capacitor,
    thereby LLC resonating the DC link voltage having passed through the switching part to transfer a resonated DC link voltage to the high voltage transformer.

3. The device of claim 1, wherein the resonance converter comprises:
    first and second capacitors for distribution and first and second switching elements of a half-bridge, for distributing the DC link voltage and transferring distributed DC link voltages to a primary side of the high voltage transformer;
    a first inductor connected between a first switching element and an output terminal of the first capacitor; and
    a second inductor connected to an output terminal of the first inductor,
    thereby LLC resonating the DC link voltage to transfer a resonated DC link voltage to the high voltage transformer.

4. The device of claim 1, wherein the resonance converter comprises:
    a switching part including a first switching element to a fourth switching element of a full bridge, for performing a switching operation complementary to each other based on a gate signal externally supplied to pass the DC link voltage; and
    an LC resonance part including:
    a first inductor correspondingly connected in series to each of output terminals of a first switching element to a fourth switching element; and
    a second inductor connected to an output terminal of the first inductor,
    thereby LC resonating the DC link voltage having passed through the switching part to transfer a resonated DC link voltage to the high voltage transformer.

5. The device of claim 1, wherein the resonance converter comprises:
    a first resonance converter; and
    a second resonance converter,
    wherein the first resonance converter includes:
    a first switching part provided with a plurality of switching elements, connected to one terminal and an opposite terminal of the DC link voltage, for performing a complementary switching operation to each other based on a gate signal of a gate driver to pass the DC link voltage; and
    a first LC resonance part including an inductor and a capacitor, for LC resonance, respectively connected to one terminal and an opposite terminal of the first switching part, for converting a series link voltage into a DC voltage and then LC resonating DC link voltages, and
    wherein the second resonance converter includes:
    a second switching part provided with a plurality of switching elements, connected to one terminal and an opposite terminal of the DC link voltage, for performing a complementary switching operation to each other based on a gate signal of the gate driver to pass the DC link voltage; and
    a second LC resonance part including an inductor and a capacitor, for LC resonance, respectively connected to one terminal and an opposite terminal of the second switching part, for converting a series link voltage into a DC voltage and then LC resonating DC link voltages.

6. The device of claim 5, wherein the high voltage transformer comprises:
    a first high voltage transformer; and a second high voltage transformer,
wherein the first high voltage transformer is provided as a transformer for high voltage, for shifting a phase and stepping up an output signal of a frequency resonated in a first resonance converter,
and the second high voltage transformer is provided as a transformer for high voltage, for shifting a phase and stepping up the output signal of a frequency resonated in a second resonance converter.

7. The device of claim 6, wherein the DC-DC converter comprises:
a first DC-DC converter; and
a second DC-DC converter,
wherein the first DC-DC converter is provided with a plurality of switching elements, for performing a complementary switching operation to each other based on a gate signal externally supplied, to convert an output signal of the first high voltage transformer into DC and transfer a converted DC output signal to the high voltage battery,
and the second DC-DC converter is provided with a plurality of switching elements, for performing a complementary switching operation to each other based on a gate signal externally supplied, to convert an output signal of the second high voltage transformer into DC and transfer a converted DC output signal to the high voltage battery.

8. The device of claim 2, wherein the DC-DC converter comprises:
a fifth switching element to an eighth switching element correspondingly connected in parallel to the first and second terminals of the secondary side of the high voltage transformer, for performing a complementary switching operation to each other to convert an output signal of the high voltage transformer into DC; and
a capacitor for high voltage output connected between the fifth switching element and the seventh switching element, and the sixth switching element and the eighth switching element, for linking a DC voltage to the high voltage battery to transfer a linked high voltage to the high voltage battery; and
a ninth switching element and a tenth switching element connected in parallel to the first and second terminals of the primary side of the low voltage transformer, for performing a complementary switching operation to each other, to transfer the high voltage of the capacitor for high voltage output to the low voltage transformer.

9. The device of claim 1, wherein the low voltage transformer further comprises:
an inductor connected between the second terminal of the low voltage transformer and an output terminal of the ninth switching element, for removing a leakage current.

10. The device of claim 9, wherein the filter comprises:
a first diode and a second diode each connected between one terminal and an opposite terminal, of a secondary side of the low voltage transformer, for half-wave rectifying the output signal of the low voltage transformer;
an inductor for a first filter and an inductor for a second filter respectively connected to one output terminal of the first diode and one terminal of a secondary side of the low voltage transformer and to one output terminal of the second diode and an opposite terminal of the secondary side of the low voltage transformer, for filtering based on a preset inductance for each of the output signals half-wave rectified of the first diode and the second diode; and
a capacitor for low voltage output linking output voltages of the inductor for a first filter and the inductor for a second filter in series, for providing a low voltage smaller than that of the high voltage battery to the low voltage battery.

11. The device of claim 3, wherein the DC-DC converter comprises:
a fifth switching element to an eighth switching element correspondingly connected in parallel to the first and second terminals of the secondary side of the high voltage transformer, for performing a complementary switching operation to each other to convert an output signal of the high voltage transformer into DC; and
a capacitor for high voltage output connected between the fifth switching element and the seventh switching element, and the sixth switching element and the eighth switching element, for linking a DC voltage to the high voltage battery to transfer a linked high voltage to the high voltage battery; and
a ninth switching element and a tenth switching element connected in parallel to the first and second terminals of the primary side of the low voltage transformer, for performing a complementary switching operation to each other, to transfer the high voltage of the capacitor for high voltage output to the low voltage transformer.

12. The device of claim 2, wherein the low voltage transformer further comprises:
an inductor connected between the second terminal of the low voltage transformer and an output terminal of the ninth switching element, for removing a leakage current.

13. The device of claim 12, wherein the filter comprises:
a first diode and a second diode each connected between one terminal and an opposite terminal, of a secondary side of the low voltage transformer, for half-wave rectifying the output signal of the low voltage transformer;
an inductor for a first filter and an inductor for a second filter respectively connected to one output terminal of the first diode and one terminal of a secondary side of the low voltage transformer and to one output terminal of the second diode and an opposite terminal of the secondary side of the low voltage transformer, for filtering based on a preset inductance for each of the output signals half-wave rectified of the first diode and the second diode; and
a capacitor for low voltage output linking output voltages of the inductor for a first filter and the inductor for a second filter in series, for providing a low voltage smaller than that of the high voltage battery to the low voltage battery.

14. The device of claim 4, wherein the DC-DC converter comprises:
a fifth switching element to an eighth switching element correspondingly connected in parallel to the first and second terminals of the secondary side of the high voltage transformer, for performing a complementary switching operation to each other to convert an output signal of the high voltage transformer into DC; and
a capacitor for high voltage output connected between the fifth switching element and the seventh switching element, and the sixth switching element and the eighth switching element, for linking a DC voltage to the high voltage battery to transfer a linked high voltage to the high voltage battery; and a ninth switching element and a tenth switching element connected in parallel to the first and second terminals of the primary side of the low voltage transformer, for performing a complementary switching operation to each other, to transfer the high voltage of the capacitor for high voltage output to the low voltage transformer.

15. The device of claim 3, wherein the low voltage transformer further comprises:

an inductor connected between the second terminal of the low voltage transformer and an output terminal of the ninth switching element, for removing a leakage current.

16. The device of claim 15, wherein the filter comprises:

a first diode and a second diode each connected between one terminal and an opposite terminal, of a secondary side of the low voltage transformer, for half-wave rectifying the output signal of the low voltage transformer;

an inductor for a first filter and an inductor for a second filter respectively connected to one output terminal of the first diode and one terminal of a secondary side of the low voltage transformer and to one output terminal of the second diode and an opposite terminal of the secondary side of the low voltage transformer, for filtering based on a preset inductance for each of the output signals half-wave rectified of the first diode and the second diode; and a capacitor for low voltage output linking output voltages of the inductor for a first filter and the inductor for a second filter in series, for providing a low voltage smaller than that of the high voltage battery to the low voltage battery.

* * * * *